United States Patent [19]

Jaquette et al.

[11] Patent Number: 5,165,089
[45] Date of Patent: Nov. 17, 1992

[54] OPTICAL DISK PLAYERS HAVING READBACK CIRCUITS WITH NOISE REJECTION AND READ SIGNAL RETIMING

[75] Inventors: Glen A. Jaquette; Roger J. Justo, both of Tucson, Ariz.

[73] Assignee: International Business Machines Corporation, Armonk, N.Y.

[21] Appl. No.: 591,160

[22] Filed: Oct. 1, 1990

[51] Int. Cl.⁵ ............................................. H04N 5/76
[52] U.S. Cl. ........................................ 369/59; 360/45
[58] Field of Search .................. 360/45, 53; 369/59, 369/60, , 124, 48; 371/7; 307/518, 234

[56] References Cited

U.S. PATENT DOCUMENTS

| | | | |
|---|---|---|---|
| 3,483,539 | 12/1969 | Poumakis | 360/45 X |
| 3,879,752 | 4/1975 | Heidecker | 360/40 |
| 4,907,100 | 3/1990 | Nishiyama et al. | 360/45 |
| 4,937,687 | 6/1990 | Sengoku | 360/51 |
| 5,003,408 | 3/1991 | Farkas et al. | 360/51 |

FOREIGN PATENT DOCUMENTS 0284279  9/1988  European Pat. Off. .

Primary Examiner—Aristotelis Psitos
Assistant Examiner—Joseph P. Kraynak, Jr.
Attorney, Agent, or Firm—H. F. Somermeyer

[57] ABSTRACT

In an optical disk player, such as for a magnetooptic player, wherein the data recorded on the optical medium are at recording at such high densities then intersymbol interference causes the peaks of the readback signals to become closer together resulting in phase errors. A transition selecting means is operative to select a transition indicated by the readback signal or a substitute transition indicated by a timed delay means generates a signal based upon the immediately preceding transition received from optical medium. Various embodiments of the invention are illustrated.

13 Claims, 2 Drawing Sheets

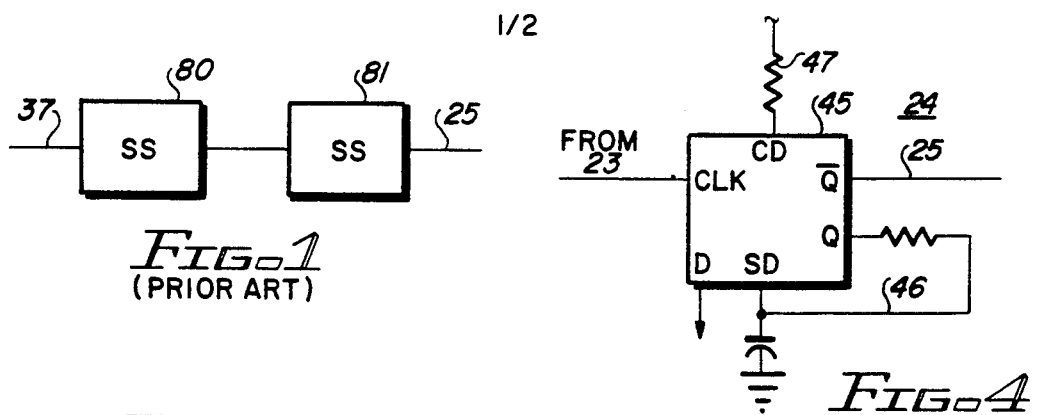
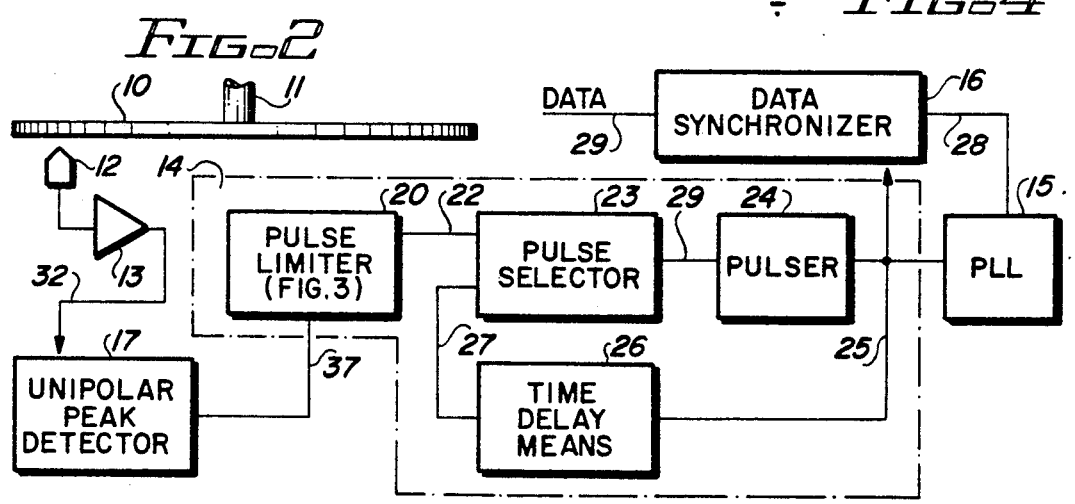
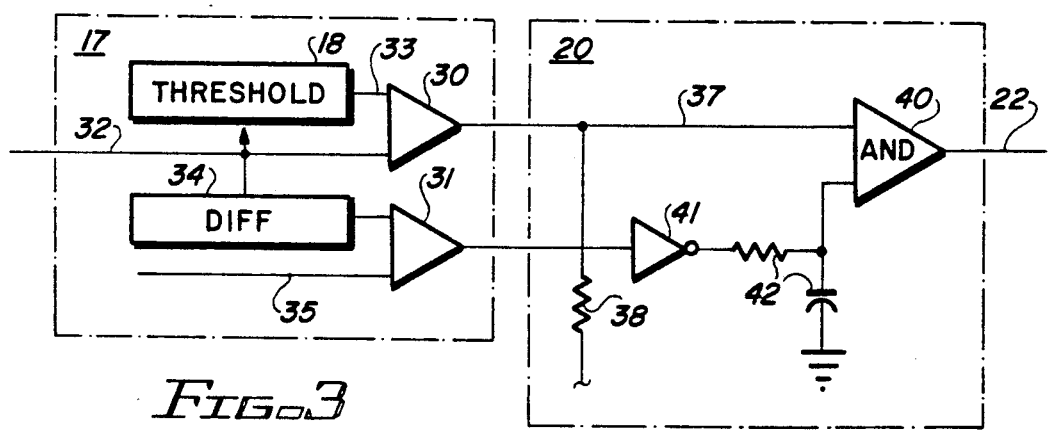
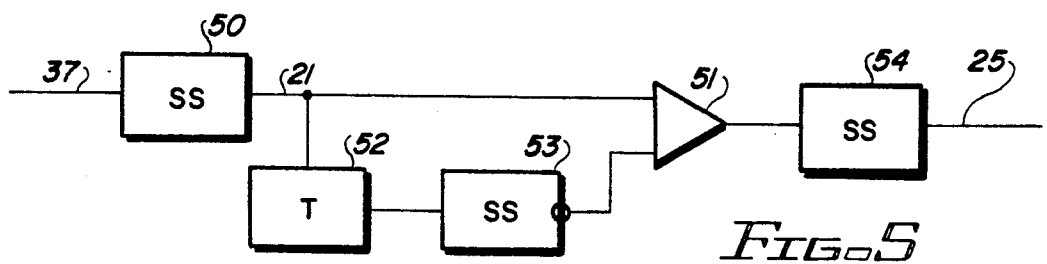

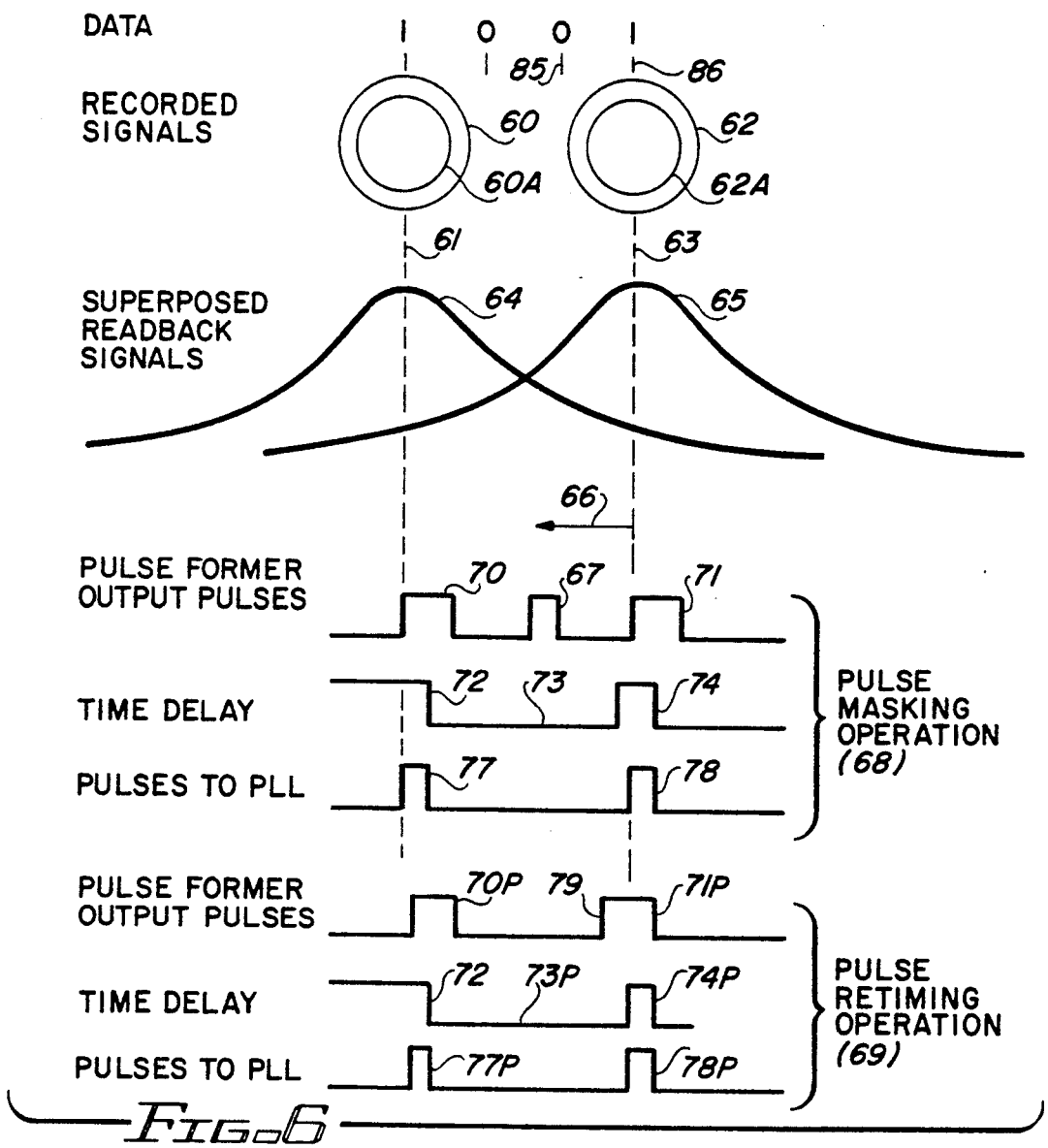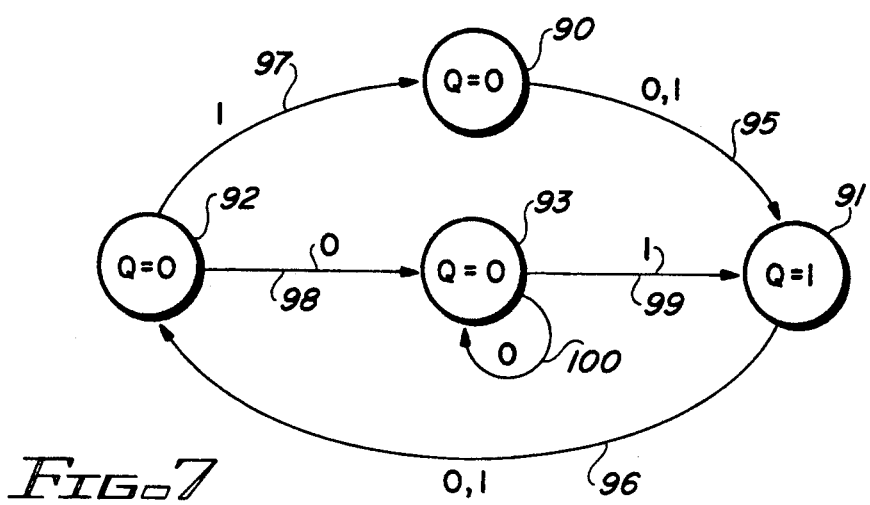

OPTICAL DISK PLAYERS HAVING READBACK CIRCUITS WITH NOISE REJECTION AND READ SIGNAL RETIMING

FIELD OF THE INVENTION

The present invention relates to optical disk players, more particularly in maintaining proper timing control of the readback operation of such players.

BACKGROUND OF THE INVENTION

Magnetooptic media has been used for storing digital data and analog data in digital forms. Many current day recording systems encode data using a (2,7) run length limited (RLL) modulation code and store the encoded data on the disk using pulse position modulation (PPM). PPM recording on magnetooptic media is achieved by writing magnetic domains, marks, of a certain polarity to the disk for each 1 in the encoded data. No mark is written for a 0. When the record is read by scanning over the data with a laser beam, the written marks will rotate the polarization of the laser beam differently then when the laser beam is scanning over parts of the record where no marks are written. Thus by detecting the polarization rotation of the laser beam, a readback signal is produced. Each mark will produce a signal peak in the readback signal. The highest density patterns of the encoded data, when stored to the disk at high linear densities, result in undesired intersymbol interference (ISI). ISI occurs when the encoded data has two 1s separated by the minimum number of 0s. For the (2,7) RLL code the minimum number of 0 corresponds to the d constaint of the code, 2. The effect of such ISI in PPM is to move the peaks of the readback signal closer together. Also, the valley between the two peaks will be higher then the valleys corresponding to a longer string of 0s. The readback signal is converted to an asynchronized logic stream (ASYNC DATA) by a peak detector which produces a pulse for each peak of sufficient amplitude in the readback signal. The ASYNC DATA is input to a synchronizer which uses a phase locked loop (PLL). The leading edge (LE) of ASYNC DATA pulses into the synchronizer should nominally occur centered in the clock cells of the synchronizer to allow for the most margin in data synchronization The peak movement produced by ISI results in the LEs of the two pulses in the ASYNC DATA being moved closer together. This moves the LEs out of the center of the clock cell of the synchronizer and can be regarded as a phase error. Such phase error in the ASYNC DATA, coupled with the timing jitter produced by noise on the readback signal into the peak detector, coupled with imperfect mark formation due to defects in (and non-uniformity of) the magnetooptic media, can result in movement of the LEs of ASYNC DATA pulses out of the proper clock cell and into the next, producing an error in the data out of the synchronizer. Additionally, noise on the readback signal and media defects can produce false signal peaks. This is particularly true in the shallow valleys between peaks written at the minimum spacing due to the high density patterns in the encoded data stream. Another mechanism in PPM magnetooptic recording that can produce errors is thermal interaction effects when marks are being written. Marks are written by heating the magnetooptic media with a laser beam above the Curie temperature while applying a magnetic field which has a polarity opposite that of the media before heating. When the laser power is reduced, the temperature of the magnetooptic media drops below the Curie temperature and the magnetization of the written mark is frozen at the magnetic polarity of the applied magnetic field, opposite of the surrounding media which did not exceed the Curie temperature. When two marks are written sequentially close together, the media heating produced by the formation of the first mark has not totally dissipated when the second mark is being formed. This dissipation of the heat from the formation of the first mark forms a thermal gradient as the heat flows away from the first mark. When the second mark is being formed, the media will heat more readily in the direction towards the first mark. Thus the mark formation will not be symmetric, but will instead tend to grow towards the first mark. The peak of the readback signal corresponds to the center of the written mark. Thus, aside from ISI, the peak corresponding to the second written mark will shift towards the first. Like ISI, this problem manifests itself most noticeably at the high density patterns of the encoded data stream. The three effects discussed (ISI induced peak shift, false peak detection in the valley between two peaks, and thermal interaction between written marks) are all much worse for the highest density pattern (corresponding to two 1s separated by two 0s in the case of a (2,7) RLL code) then for any other. In particular, the second peak of an isolated 1001 pattern for a (2,7) code is troublesome due to the shallow slope of the readback signal in the leading part of the clock cell. As a result, a major failure mechanism at high linear recording densities is for the second peak on the readback signal corresponding to a high density pattern to be detected as having occurred early (e.g. when 1001000 is recorded but a 1010000 is clocked out of the data synchronizer on readback). For the case when two high density patters are adjacent, most ISI will cancel for the middle 1, though the other two effects still contribute to misdetection (i.e. a 1001001 being detected as a 10100001). Both of the aforementioned failure mechanisms result in a written 01 being read as a 10 and can be called a bit swapping error. Depending on the read detector design, false peaks in the shallow valleys between peaks corresponding to the high density patterns can also be manifested by an 0 being detected as a 1 (i.e. a 1001 being detected as a 1011, 1101 or a 1111). This could be called an extra 1 error. In addition to the errors induced in the synchronized data, these failure mechanisms produce erroneous phase information to the PLL which shift the phase of the clock. When the PLL clock is shifted by an erroneous phase update, the detection margin is affected until proper phase lock is reacquired. Proper synchronization is required to define the boundaries of the (d,k) code symbol groups. If the PLL is severely affected bit slip or loss of phase lock may occur. Bit slip (the synchronizer gaining or losing one clock cycle) can result in erroneous data until the decoder reacquires synchronization at a resync feature; loss of phase lock can result in loss of the rest of the record. It is desired that bit swapping and extra 1s be prevented so that errors in the synchronized data and the resultant possibility of bit slip and loss of phase lock be avoided. It is also desired that the extra 1s and bit swapping be prevented in the variable frequency oscillator (VFO) field at the beginning of the record before data as this can cause the PLL to take longer to acquire phase lock and detect that phase lock has occurred. Correction of these failure mechanisms allows the PLL to become slaved to the phase of the LEs of the ASYNC DATA pulses more quickly. Also, by preventing these failure mechanisms, the readback reliability is increased and sensitivity of the readback circuits to noise and ISI is greatly reduced.

Discussion of Prior Art

FIG. 1 illustrates a prior art system which masks undesired phase shifted ASYNC DATA pulses, but is unable to retime the pulses to a desired pulse position. Numeral 32 indicates a source of the readback signal as will become more apparent. A first single shot SS80 masks the extra 1s and bit swapping while SS81 is a pulse former for obtaining a proper pulse duration limited signal to be supplied over line 25 to the data synchronizer using a PLL.

Paumakis U.S. Pat. No. 3,483,539 shows a circuit for retiming of signals. The present invention provides for an improved operation of retiming while masking extra 1s with a minimum of electronic components.

SUMMARY OF THE INVENTION

The object of the present invention is to provide a simple but effective readback signal masking means for masking out undesired ASYNC DATA pulses to prevent extra 1s out of the data synchronizer. A further objective is to allow quicker acquisition of phase lock and prevent bit slip and loss of phase lock where possible.

An optical signal player for reading signals from an optical storage medium includes means for optically sensing signals recorded on the optical storage medium and supplying an electrical signal representative of the recorded signals. If the signal was encoded using PPM, the electrical signal read will be a unipolar signal, with either positive or negative peaks indicating the recorded marks, one for each 1 in the encoded signal recorded. For simplicity in discussion, the following description assumes that the positive peaks of the electrical readback signal correspond to the marks written on the optical disk by means of embossing or by means of a laser beam which causes a change to the physical or magnetic properties of the optical disk (e.g. by ablation, material phase transition, or magnetic polarization alteration). A unipolar peak detection, UPD, means is connected to the sensing means for receiving the electrical signal and for forming same into a train of pulses. The LC of each pulse being representative of the time position of the positive peaks of the electrical readback signal. Time delay means, preferably a single-shot multivibrator, is connected to the UPD means for receiving the pulses. The output of the time delay means gives a brief history of the pulses from the UPD means. The output of the time domain means indicates whether a LE of a pulse has been received within the minimum amount of time that can be expected between recorded peaks due to the d constraint of a (d,k) code. Pulse selector means is connected to the UPD means and the time delay means and acts to selectively mask or retime the pulses from the UPD means. When a new pulse from the UPD means arrives at the peak selection means and the time delay means indicates that the LE of the laser preceding pulse did not occur within the time delay it is set for, the new pulse is passed through by the pulse selector means. When a new pulse from the UPD means arrives at the peak selection means and the time delay means indicates that the LE of the last preceding pulse did not occur within the time delay it is set for, the LE of the new pulse is not passed through by the pulse selector means. If the time delay from the preceding pulse expires before the new pulse is finished, the remainder of the pulse is allowed through. In this way, the leading edge of the new pulse has been retimed to assure that it has occurred at least some period of time, determined by the time delay means, after the preceding pulse, this can convert a ASYNC DATA pulse sequence which would produce a bit swapping error out of the data synchronizer into a RETIMED DATA pulse sequence which does not. If the time delay from the preceding pulse does not expire before the new pulse is finished, no pulse is allowed through. In this way false peaks that occur in the shallow valleys between recorded peaks can be masked, and no corresponding pulse occurs in the RETIMED DATA pulse sequence. The output of the pulse selector means, RETIMED DATA, is connected to a PLL means which means slays its operation to the timing of the LEs of the incoming pulse sequence. A data sequencer means is connected to the output of the PLL means and to the pulse selector means for detecting the data represented by readback signal and in timed relationship to the PLL timing pulses.

In a preferred form of the invention, a pulser means is connected to the output of the pulse selector means. The pulser means, preferably a monostable multivibrator, outputs a pulse of standardized width for each incoming pulse. Thus the output of the pulser means maintains the relative timing of the LE of the pulses while adjusting the widths of the pulses. The output of the pulser means is then connected to the data sequencer means and the PLL means in place of the output of the pulse selector means, RETIMED DATA. In another embodiment, the time delay means operates from the pulser means in place of the output from the UPD means. In another embodiment, a pulse limiter means is intervened between the UPD means and the pulse detecting means.

The foregoing and other objects, features and advantages of the invention will be apparent from the following more particular description of preferred embodiments of the invention, as illustrated in the accompanying drawings.

DESCRIPTION OF THE DRAWINGS

FIG. 1 is a simplified showing of a prior art system for masking pulses in undesired positions.

FIG. 2 is a simplified block schematic diagram of an optical player in which the present invention is advantageously employed including the incorporation of the invention into such player.

FIG. 3 is a schematic diagram of positive peak detector and pulse limiter useful with the FIG. 2 illustrated apparatus as an input to retiming and masking circuits.

FIG. 4 is a simplified diagram of a pulser usable at the output of the pulse selector means to standardize the pulse widths into the data synchronizer means, the PLL means, and the time delay means (depending on invention embodiment). This pulser means is implemented using a standard flip-flop as a monostable multivibrator. This circuit configuration can also be used as a pulse limiter means.

FIG. 5 is a simplified diagram of an alternate embodiment of the present invention.

FIG. 6 is a set of waveforms illustrating operation of the invention.

FIG. 7 is a state diagram for processing a synchronized data stream into a data stream which does not violate the d constraint of a (2,7) RLL code.

DETAILED DESCRIPTION

Referring now more particularly to the appended drawings, like numerals indicate like parts and structural features in the various figures. A magnetooptic rotatable disk 10 is rotated by a motor 11 which is suitably mounted on a frame (not shown). An optical pick up 12 scans the recording surface of disk 10. The optical beam is affected by the data recorded on the disk. The optical beam is processed optically and then impinges on optical-electrical transducers. The output of the optical pick up 19 is an electrical signal which is connected to circuit 13. Circuit 13 amplifies the signal to an amplitude sufficient for detection, filters the signal to bandlimit any noise, and inverts the signal, if necessary, to give a signal on line 32 suitable for detection. The unipolar peak detector 17 processes the analog signal 32 to give a logic signal 37 which has a pulse for each positive peak of sufficient amplitude on 32. The signal processing circuit 14 processes the pulses on line 37 into a logic pulse stream on line 25 which provides the data synchronizer 16 and the accompanying PLL 15 with a pulse stream in which some pulses may have been masked and in which some of the pulses may have been retimed. The data synchronizer 16 synchronizes the pulse stream on line 25 to the PLL clock 28 which is phase locked to the timing of the pulse stream on line 25. The output of the data synchronizer 29 is a data signal suitable for decoding and error correction. It is to be understood that while only the read system is shown, a recording circuit can be added to the FIG. 2 illustrated player for recording signals to the disk 10 by use of the optical beam discussed in the optical pick up 12, as is well known.

Signal processing circuit 14 receives the logic signal 37 from the unipolar peak detector 17. A pulse limiter, one implementation of which is shown in FIG. 3 (and an alternate implementation is shown in FIG. 4), 20 limits the duration of pulses created from the readback signal by unipolar peak detector 17. The pulse width limited signal is supplied over line 22 to pulse selector means 23. Pulse selector means 23 will either pass pulses through if they have occurred a sufficient period of time after the leading edge of the preceding pulse or mask the leading edge of the new pulse if insufficient time has passed since the leading edge of the preceding pulse. If the trailing edge of a new pulse occurs before sufficient time has passed since the preceding pulse, he whole pulse is masked. But, if the leading edge of the new pulse is masked, and the trailing edge of the new pulse occurs after sufficient time from the leading edge of the preceding pulse, then a pulse is output on 29 which has its leading edge set by a substitute transition from the time delay means 26 over line 27. If the pulses on line 22 representing readback signal positive peaks are positive pulses, and the masking signal on line 27 which indicates that insufficient time has passed since the preceding pulse is a negative pulse, then the preferred embodiment of the pulse selector means is an AND or NAND logic gate. Of course a complimentary implementation exists if the logic polarities of 22 and 27 are reversed, which would then yield a preferred embodiment of an OR or NOR logic gate. Pulse selector means supplies the new pulse stream, which has had pulses retimed or masked as necessary, over line 29 to the pulser means. The pulser means standardizes the pulse widths of the pulse stream such that the input pulse width requirements of the data synchronizer means 16, PLL means 15, and time delay means 26, to which it is connected over line 25, are met. PLL 15 responds to the pulses on line 25 in a known manner for timing the operation of the data synchronizer 16 to detect data represented by pulses on line 25, all in a known manner.

Pulser means 24 also supplies its output pulse to time delay means 26 for providing a substitute transition in proper timing as will become apparent whenever a new pulse from pulse limiter 20 occurs with insufficient time from the leading edge of the preceding pulse. In certain circuit configurations pulser 24 and pulse limiter 20 may be dispensed with, however, the input pulse width requirements of the PLL 15, data synchronizer 16, and the time delay means 26 must be met to operate properly. It has been found that pulser 24 and pulse limiter 20 greatly enhance the stability of operation of the FIG. 1 illustrated optical disk player.

FIG. 3 shows the unipolar peak detector 17 and the p7pulse width limiter 20. The input portion of FIG. 3 is a so-called qualified peak detector consisting of switching comparators 30 and 31 which supply their signals to summing node 37 in a so-called wired AND configuration. The analog readback signal on line 32 is provided to one input of comparator 30 and to a threshold circuit 18. The other input of comparator 30 is the output of the threshold circuit on line 33. Comparator 30 acts to supply information as to when the signal on line 32 exceeds the threshold on line 33 to node 37. The analog readback signal on line 32 is also input to a differentiator circuit 34 to provide a signal representing the slope of the analog readback signal on line 32 to comparator 31. The signal on line 35 at the other input to comparator 31 is set at the level of the differentiated readback signal which corresponds to zero (0) slope of the readback signal on line 32. Comparator 31 provides information as to the polarity of slope of the readback signal on line 32 to summing node 37. The output of comparator 31 makes positive transitions corresponding to positive peaks in the readback signal. The AND function at summing node 37 serve to qualify the positive peak information with the information on the amplitude of the peak from comparator 30. Thus only positive peaks of sufficient amplitude generate positive transitions at node 37. The logic function provided at node 37 is an AND function, if both comparators 30 and 31 are providing a high logic state, the pull-up resistor 38 pulls the node to a logic high value. Alternate implementations include using comparators which do not have open collector outputs, which requires using an AND gate, or pulling up comparators 30 and 31 separately and using an AND gate. Pulse limiter 20 inverts the signal on line 37 with inverter 41 and time delays the inverted signal with RC delay 42 to limit the length of positive pulses on line 37 by use of AND gate 22. Complementary implementations of pulse limiter 20 exist for inverted logic. Alternate implementations for pulse limiter 20 include a monostable multivibrator function, such as is shown by FIG. 4.

FIG. 4 illustrates a configuration of pulser 24 in a constructed embodiment. A D type flip-flop 45 receives the pulses from pulse selector means 23 into its clock input. Resistor 47 pulls up the clear bar input of the flip-flop. the D input is held low. Positive transitions at the clock input act to clock a logic low state into the flip-flop and the Q bar output goes high. The Q output goes low, however, and after some period of time determined by RC circuit 46 the flip-flop is asynchronously set because the input at the set bar input is determined to be a logic low by the flip-flop. The asynchronous set of the flip-flop switches the logic state of the flip-flop to a high state, causing the Q output to go low. Thus the Q bar output is pulsed high for each positive transition at the clock input for a period of time dependent on the RC delay 46. A complementary implementation exists where the asynchronous set bar input and the D input are pulled up; the Q bar output is filtered and delayed by an RC circuit and then connected to the clear bar input. The Q output yields the positive pulse for the alternate implementation. Additionally, there are standard monostable multivibrators or so-called "single shots" that will perform these functions.

FIG. 5 illustrates an alternate embodiment of the present invention. The line 37 signal is applied to single shot multivibrator 50 (SS 50) to assure that pulses output to AND circuit 51 have at least a minimum pulse duration. The widths of the pulses output from circuit 51 also determine how far a pulse leading edge can be shifted (retimed). The output of SS 50 goes over line 21 to AND gate 51 and to T circuit 52 which provides a propagation delay and passes the signal to SS 53 which outputs a negative pulse for some period of time after a leading edge of a positive pulse is received at its input. The output of SS 53 is input to AND gate 51 and acts to mask, retime, and pass pulses the AND gate receives from SS 50 in a manner analogous to the operation of the pulse selecting means 23 of FIG. 2 discussed above. The output of AND gate 51 is input to SS 54 which acts to standardize the pulse widths of the pulse stream. The output of SS 54 is connected to the data synchronizer 16 and associated PLL 15 over line 25. The operation of the circuit shown in FIG. 5 is such that the maximum positive pulse width that can be expected out of AND gate 51 is the sum of the propagation delays of T circuit 52 and SS 53. If the propagation delay of SS 53 is sufficient to provide adequate pulse widths at the output of AND gate 51 such that SS 54 is reliably triggered, then the T circuit is not necessary and can be removed. The minimal leading edge to leading edge time is guaranteed at the output of AND gate 51 by operation of T circuit 52, single shot multivibrator 53, and AND gate 51 is greater than the number of clock cycles required by the d constraint of a (d,k) RLL code and less than d+1 clock cycles (e.g. greater than 2 clock cycles and less than 3 for a (2,7) RLL code). The output of SS 53 is used to retime a pulse leading edges and SS 53 is of the type which will not retrigger its operation before a previous output pulse is complete (i.e. SS 53 will ignore all input pulses until its output level represents the quiescent state of its output).

In FIG. 6 operation of the invention is pictorially explained. Data encoded as 1001 and recorded on optical medium 10 is represented. This illustrates the minimum spacing between adjacent marks for data encoded using the (2,7) RLL code and PPM recording. The vertical lines underneath the 0s and 1s represents a clock timing position. The recorded marks 60 and 62 respectively represent the two one's recorded on optical medium 10. The zero's are indicated by the absence of corresponding marks, and the medium remains in the opposite or erased state. Numerals 61 and 63 respectively represent the clock timing position of the recorded marks 60 and 62. Waveform 64 and 65 respectively represent the type of waveform the marks 60 and 62 would produce on the readback signal if each were scanned by optical pick up 12 without the adjacent mark present. It can be seen that the tails of waveform 64 and 65 respectively overlap the peak of waveforms 65 and 64. As a result of the overlap, the readback signal which represents the case where the two marks 60 and 62 are scanned together displays intersymbol interference because the linear superposition of these two waveforms gives another which has the two peaks shifted towards one another. Arrow 66 illustrates the direction of movement of the peak corresponding to mark 62 for the superposition case.

The pulse masking operation 68 is represented by a first set of three idealized signals. Signals 70 and 71 respectively represent the pulse limiter 20 output pulses corresponding to recorded 1s 60 and 62 if no ISI was present. Pulse 67 represents a spurious pulse caused by noise or misdetection. The output signal from time delay means 26 includes a transition at 72 resulting from the leading edge of pulse 70 which disables the AND circuit constituting the pulse selecting means 23. The action of the circuit is evident in the trace labelled PULSES TO PLL because pulses 77 and 78 respectively represent the detected peaks resulting from recorded marks 60 and 62, but no pulse corresponding to pulse 67 is evident, it has been masked.

Pulse retiming operation 69 is illustrated by three idealized waveforms. Pulse 70 from pulse limiter 20 has been shifted towards pulse 71, and vice versa, as indicated by numerals 70P and 71P, respectively. Pulse 71P has been phase shifted such that its leading edge transition 79 is closer to the leading edge of pulse 70P than desired. The practical effect is that the clock transition 85 corresponding to a 0 may be closer to transition 79 than is the clock transition 86 indicating that a 1010 may be clocked out by the data synchronizer 16. The output of time delay means 26, preferably a single shot multivibrator, has also been shifted because of the movement of 70 such that 74P now trails the leading edge of pulse 71P. The operation of the circuit is evident in the track labelled PULSES TO PLL where pulses 77P and 78P respectively correspond to pulses 70P and 71P, but the leading edge of 78P has been retimed by means of transition 74P and pulse selecting means 23. As a result, the leading edge of 78P is now closer to transition 86 and the pattern is much more likely going to be clocked into the data synchronizer 16 as 1001. As discussed earlier, ISI, false peak detection in the shallow valleys between adjacent one's and thermal interaction during write all can contribute to the movement of the trailing peak, while only ISI affects the first one. Practice has shown that the movement of the trailing one is thus more likely. The figure demonstrates how the operation of the circuit can correct the error before synchronization and before any affect on PLL phase lock is imparted. From the above it is clearly seen that masking of spurious pulses induced by noise and retiming of pulses shifted into the preceding clock cell is provided by the relatively simple circuits shown in FIG. 2.

While the present invention is being advantageously used to retime and mask the asynchronized pulse stream before use as an input to the PLL and before data synchronization, an inferior alternate implementation can be yielded by means of a state machine after data synchronization. As best seen in FIG. 7 the logic state of line 29 output from data synchronizer 16 can be processed by a state machine which is clocked between four states 90-93. The progression from one state to the next is dictated by the logic state of line 19 as indicated by the numerals adjacent to arrow 95-100. For example, when the state machine is in state 93, the output of the state machine is 0 and the arrow 99 indicates that if line 29 is clocked in at logic state 1, the state machine will progress to state 91 and output a 1. If, however, if line 29 is clocked in at logic state 0, arrow 100 indicates that the state machine will state in state 93 and still output a 0. As can be seen by the state diagram, this state machine would act to correct all of the extra 1 cases and swapped bit cases mentioned above. It is inferior, however, for a number of reasons. First, an extra 1 preceding a tone of 100 would have infinite propagation (i.e. a 00101001001001001 would read 00100100100100100). Second, no relative position information exists in the synchronized data to delineate between when an extra 1 occurred in what should have been a string of 0s and a swapped bit (i.e. a 01000 read as a 01010 would be converted to 01001 regardless of whether it corresponded to a pulse at the beginning or end of the clock cell in error). Third, and most importantly, use of the state machine operating on the synchronized data makes the presumption that a clock can be correctly derived to synchronize the data. Practice has shown that the effect extra 1s and swapped bits on the asynchronous pulse stream can be very deleterious to the operation of the PLL and can cause it to slip a clock cycle or lose phase lock altogether.

While the invention has been particularly shown and described with reference to preferred embodiments thereof, it will be understood by those skilled in the art that various changes in form and details may be made therein without departing from the spirit and scope of the invention:

What is claimed is:

1. An apparatus for processing readback signals in an optical medium player for sensing signals optically recorded on an optical medium and wherein readback signals derived from the optical medium recorded signals have peaks spaced apart by an integral number of clock periods and are subject to peak shift wherein the peaks move closer together, including, in combination:

sensing means including pickup means and having means for supporting an optical medium and the pickup means for relative movement for enabling scanning the optical medium to generate readback signals representative of the data stored on the optical medium;

a data detector connected to the sensing means for receiving the readback signals for data detection;

a PLL connected to the data detector for timing the data detection for detecting data carried in the readback signals;

a data synchronizer connected to the data detector and to the PLL for synchronizing the data pulses from the data detector to the clock corresponding to that data derived by the PLL;

pulse processing means electrically interposed between data detector means and the PLL (and the data synchronizer) for masking out data pulses from undesired signal peaks and for retiming data pulses from phase-shifted signal peaks to enable proper clock derivation by the PLL and to enable proper data synchronization of the corrected pulse stream with the PLL derived clock and including a time delay means for delaying a previous signal transition a predetermined time and pulse selecting means connected to the data detector means and to the time delay means for rejecting signal peaks received from the sensing means during said predetermined time and said time delay means supplying a substitute transition to the pulse selecting means after said predetermined time expires for the pulse selecting means to pass the substitute transition to the PLL and data synchronizer 2. In the apparatus set forth in claim 1 further including, in combination:

said data detection means for detecting run length limited encoded data, said run length limited encoded data having a minimal spacing between successive peaks having a fixed number of PLL clock periods and another spacing between successive peaks which has a predetermined number of PLL clock periods greater than the fixed number of PLL clock periods;

the time delay means having a predetermined time greater than said fixed number of clock periods and less than the elapsed time of said predetermined number of PLL clock periods;

pulse limiting means in the PLL control means for generating pulses from peaks of the readback signals having a predetermined width less than one of said PLL clock periods but more than some minimum required width; and said time delay means inhibiting said pulse selection means from passing any pulses during said predetermined time.

3. In the apparatus set forth in claim 2 further including, in combination:

a pulser electrically interposed between the pulse selecting means and the PLL and data synchronizer and time delay means for shaping pulses to a predetermined short duration more than the minimum acceptable input pulse width to the data synchronizer, PLL, and time delay means.

4. In the apparatus set forth in claim 2 further including, in combination:

said data detector means being a qualified unipolar peak detector.

5. In the apparatus set forth in claim 2 further including, in combination:

said data detection means for detecting said data in a run length limited code of the d,k type having said fixed number of clock periods d, where d is an integer;

said time delay means having a predetermined time between d clock periods and d+1 clock periods.

6. In the apparatus set forth in claim 5 further including, in combination:

said time delay means being a single-shot multivibrator;

said single-shot multivibrator supplying a pulse selection inhibition signal for said predetermined time having a duration of about d plus 0.5 clock periods; and said pulse selecting means being a logical AND circuit.

7. In the apparatus set forth in claim 2 further including, in combination:

said time delay means having an input connected to the pulse forming means for receiving pulses directly from said pulse limiting means and including a single-shot multivibrator responsive to said received pulses and having an output connected to the pulse selecting means 8. In the apparatus set forth in claim 7 further including, in combination:
said pulse selecting means being a logical AND circuit 9. In the apparatus set forth in claim 7 further including, in combination:
said pulse limiting means is a single-shot multivibrator.

10. An apparatus for moving phase shifted peaks of a data signal having bit positions at clock period intervals and having a minimum spacing between two successive transitions of a predetermined number of said clock periods and being subjected to a phase-shifted too-early transition position to a desired transition position, sensing means in an optical disk player generating the data signal, the data signal being subjected to intersymbol interference when two successive peaks are spaced apart a minimal distance, such interference causing the data signal peaks to move closer together as a phase shift error, including, in combination:
a data detector including a pulse limiter connected to the sensing means for generating data pulses from peaks of the data signal such that the pulses each have a duration less than the clock period but greater than a predetermined minimum width;
the data detector having an AND circuit having first and second inputs and an AND outputs, said first input being connected to the pulse limiter for receiving the data pulses for emitting AND pulses, one AND pulse being emitted for each said received data pulse at said first input;
the data detector having a pulser connected to the AND output of the AND circuit for receiving and responding to said AND pulses for emitting output pulses respectively for said received AND pulses;
a PLL connected to the pulser for timing its operation to the output pulses for generating clock pulses;
a data synchronizer connected to the data detector and to the PLL for synchronizing the output pulses received from the data detector to the clock pulses; and
the data detector having a single-shot multivibrator having a activating input connected to said pulse limiter and a control output connected to said second input of the AND circuit, said single-shot multivibrator responding to each data pulse received from said pulse limiter for generating a control pulse that is active for a predetermined period of time having a duration greater than one of said clock period intervals for each actuation of the single-shot multivibrator and for supplying said control pulse to said second input of the AND circuit for inhibiting said AND circuit from supplying said AND pulse at said AND output for said predetermined period of time.

11. In the apparatus set forth in claim 10 further including, in combination:
said data data detector for detecting data from a data signal encoded in a d,k code wherein d is a minimum number of non-transition positions between two successive transitions and the spacing between two successive transition positions being a clock period of the PLL; and
said single-shot multivibrator generating the predetermined active time to be greater than d clock periods and less than d+1 clock periods.

12. In apparatus for processing readback signals in an optional medium player for sensing signals optically recorded on an optical medium and wherein readback signals derived from the optical medium recorded signals have peaks spaced apart by an integral number of clock periods and are subject to peak shift wherein the peaks move closer together, including, in combination:
sensing means for sensing the recorded signals and producing the readback signals;
a first single-shot multivibrator having an input and a pulse output with the input connected to the sensing means for receiving the produced readback signals and generating sensed data pulses at the pulse output, each sensed data pulse having a duration of about one of said clock periods;
data detection means connected to the pulse output for receiving said data pulses for detecting the data carried thereby;
said data detection means having a second single-shot multivibrator having an input connected to the pulse output for receiving the data pulses and generating control pulses each having a duration greater than a predetermined number of said clock periods and supplying the control pulses to a control output;
said data detection means having an AND circuit having a pair of inputs respectively connected to said pulse and control outputs and having an AND output for supplying output data pulses; and
a PLL connected to said AND output for receiving said output data pulses from the AND circuit for generating timing pulses; and
a data synchronizer connected to said AND output for receiving the output data pulses from the AND circuit and connected to the PLL for receiving said timing pulses for synchronizing said output data pulses received from said AND output to said timing pulses.

13. In apparatus for processing readback signals in an optical medium player for sensing signals optically recorded on an optical medium and wherein readback signals derived from the optical medium recorded signals have peaks spaced apart by an integral number of clock periods and are subject to peak shift wherein the peaks move closer together, including, in combination:
sensing means for sensing the recorded signals and producing the readback signals;
a time delay means including a first single-shot multivibrator having an input and a mask output, the input connected to the sensing means for receiving the produced readback signals and generating data masking pulses at the mask output, each data masking pulse having a predetermined duration greater than one of said clock periods;
an AND circuit means having a pair of inputs respectively connected to said sensing means and said mask output and having an AND output for supplying masked data pulses from the AND circuit means; and
a second single-shot multivibrator having an input connected to the AND output for receiving the masked data pulses and for generating output data pulses, each said output data pulse having a predetermine duration not greater than a predetermined number of said clock periods, said second single-shot multivibrator supplying the output data pulses to a data output;
a PLL connected to said data output for receiving said output data pulses from the AND circuit means for generating clock pulses; and
a data synchronizer connected to said data output and to said PLL for receiving said output data pulses and said clock pulses for synchronizing said received output data pulses to the clock pulses.

* * * * *